US012766939B2

(12) United States Patent
Zhang et al.

(10) Patent No.: US 12,766,939 B2
(45) Date of Patent: Oct. 20, 2026

(54) TOP HANGING TYPE BATTERY PACK AND ELECTRIC VEHICLE

(71) Applicants: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

(72) Inventors: Jianping Zhang, Shanghai (CN); Chunhua Huang, Shanghai (CN); Xinrui Yu, Shanghai (CN)

(73) Assignees: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 326 days.

(21) Appl. No.: 18/572,814

(22) PCT Filed: Nov. 30, 2022

(86) PCT No.: PCT/CN2022/135364
§ 371 (c)(1),
(2) Date: Dec. 21, 2023

(87) PCT Pub. No.: WO2023/098714
PCT Pub. Date: Jun. 8, 2023

(65) Prior Publication Data

US 2024/0286479 A1 Aug. 29, 2024

(30) Foreign Application Priority Data

Nov. 30, 2021 (CN) ......................... 202111444383.8
Dec. 26, 2021 (CN) ......................... 202111606763.7

(Continued)

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *B60L 53/80* (2019.02);
(Continued)

(58) Field of Classification Search
CPC .... B60K 2001/0405; B60K 2001/0438; B60K 2001/0455; B60K 2001/0472; B60K 1/04;
(Continued)

(56) References Cited

U.S. PATENT DOCUMENTS

2020/0055383 A1 2/2020 Zhang
2021/0380001 A1* 12/2021 Hörder .............. H01M 10/6568
2023/0173904 A1* 6/2023 Ragot ................. H01M 50/244 180/68.5

FOREIGN PATENT DOCUMENTS

CN 106427514 A 2/2017
CN 206186768 U 5/2017
(Continued)

OTHER PUBLICATIONS

Feb. 20, 2023 International Search Report issued in International Patent Application No. PCT/CN2022/135364.
(Continued)

*Primary Examiner* — Lori Wu

(57) ABSTRACT

The present application discloses a top hanging type battery pack and an electric vehicle. The top hanging type battery pack is detachably connected to locking mechanisms on longitudinal beams of an electric vehicle. The top hanging type battery pack comprises a battery pack case and lock connecting structures. When the top hanging type battery pack is installed on an electric vehicle, the center of gravity
(Continued)

of the battery pack is low and located below the longitudinal beams, thereby lowering the center of gravity of the whole electric vehicle and improving the driving stability of the electric truck; moreover, the battery pack does not occupy the space behind the driver, and thus, the driving experience can be improved, or the electric vehicle can provide more space to carry more goods.

20 Claims, 11 Drawing Sheets

(30) Foreign Application Priority Data

Dec. 26, 2021 (CN) ......................... 202111606781.5
Dec. 31, 2021 (CN) ......................... 202111667348.2

(51) Int. Cl.

| | |
|---|---|
| ***B60L 53/80*** | (2019.01) |
| ***H01M 50/204*** | (2021.01) |
| ***H01M 50/209*** | (2021.01) |
| ***H01M 50/244*** | (2021.01) |
| ***H01M 50/249*** | (2021.01) |
| ***H01M 50/262*** | (2021.01) |
| ***H01M 50/264*** | (2021.01) |
| ***H01M 50/289*** | (2021.01) |
| *H01M 50/242* | (2021.01) |

(52) U.S. Cl.

CPC ....... *H01M 50/204* (2021.01); *H01M 50/209* (2021.01); *H01M 50/244* (2021.01); *H01M 50/249* (2021.01); *H01M 50/262* (2021.01); *H01M 50/264* (2021.01); *H01M 50/289* (2021.01); *B60K 2001/0405* (2013.01); *B60K 2001/0438* (2013.01); *B60K 2001/0455* (2013.01); *B60K 2001/0472* (2013.01); *H01M 50/242* (2021.01); *H01M 2220/20* (2013.01)

(58) Field of Classification Search

CPC .. H01M 10/46; H01M 50/204; H01M 50/209; H01M 50/244; H01M 50/249; H01M 50/262; H01M 50/264; H01M 50/271; H01M 50/289; H01M 50/242; H01M 50/20; H01M 2220/20; B60L 50/64; B60L 50/66; B60L 53/80; B60L 2200/36

See application file for complete search history.

(56) References Cited

FOREIGN PATENT DOCUMENTS

| | | | |
|---|---|---|---|
| CN | 112776582 | A | 5/2021 |
| CN | 113415142 | A | 9/2021 |
| CN | 217197745 | U | 8/2022 |
| CN | 217197751 | U | 8/2022 |
| CN | 217415447 | U | 9/2022 |
| CN | 115284860 | A | 11/2022 |
| CN | 115303045 | A | 11/2022 |
| JP | 2013025877 | A | 2/2013 |

OTHER PUBLICATIONS

Feb. 20, 2023 Written Opinion of the International Searching Authority issued in International Patent Application No. PCT/CN2022/135364.

* cited by examiner

TOP HANGING TYPE BATTERY PACK AND ELECTRIC VEHICLE

The present application is a National Stage of International Application No. PCT/CN2022/135364, filed on Nov. 30, 2022, which claims the priorities of Chinese patent application CN2021116673482 filed on Dec. 31, 2021, Chinese patent application CN2021116067637 filed on Dec. 26, 2021, Chinese patent application CN2021116067815 filed on Dec. 26, 2021, and Chinese patent application CN2021114443838 filed on Nov. 30, 2021. The contents of the Chinese patent application are incorporated herein by reference in their entireties.

TECHNICAL FIELD

The present application relates to the field of battery swapping, particularly relates to a top hanging type battery pack and an electric vehicle.

BACKGROUND

In recent years, new energy vehicles have developed rapidly, electric vehicles relying on batteries as driving energy have advantages of zero-emission and low noise, with an increase in market share and frequency of use of electric vehicles, electric commercial vehicles among the current electric vehicles, such as electric heavy-duty trucks and electric light-duty trucks, are gradually appearing in their respective application scenarios, at the same time, battery swapping stations are correspondingly built to perform battery pack swapping for electric trucks.

Currently, battery packs on electric trucks are arranged above longitudinal beams, and the weight of a battery pack can reach about 3 tons, due to its relatively heavy weight, the center of gravity of an electric truck with a battery pack mounted is relatively high, thereby affecting the stability for driving the electric truck and occupying a large space behind the driver, making a poor driving experience to the driver.

CONTENT OF THE PRESENT INVENTION

A technical problem to be solved in the present application is to overcome the defects in prior arts that the center of gravity is relatively high due to mounting a battery pack, affecting the stability for driving the electric truck, occupying a large space behind the driver by the battery pack, and making a poor driving experience to the driver, providing a top hanging type battery pack and an electric vehicle.

The present application solves the above-mentioned technical problem through the following technical solutions:

A top hanging type battery pack, the top hanging type battery pack is detachably connected to a locking mechanism of a longitudinal beam of an electric vehicle, the top hanging type battery pack comprising a battery pack box and a lock connecting structure; the lock connecting structure comprising a mounting bracket and several of horizontally arranged hanging members, at least one end of several of the hanging members is connected to the mounting bracket; an recessed groove recessing toward interior of the battery pack box is arranged to the top of the battery pack box at a position corresponding to the longitudinal beam, the mounting bracket is arranged in the groove, and the battery pack box is detachably connected to the longitudinal beam by means of cooperations between several of the hanging members and the locking mechanism.

In the present solution, a battery pack mounted on a longitudinal beam of an electric vehicle is designed, when the top hanging type battery pack is mounted on the electric vehicle, the center of gravity of the battery pack is relatively low and is located under the longitudinal beam, thereby lower the center of gravity of the entire electric vehicle and improve the stability for driving the electric truck, at the same time, the battery pack will not occupy the space behind the driver, improving the driving experience or freeing more space up for the electric vehicle to carry more goods. At the same time, the battery pack can realize performation of a chassis battery swapping, comparing to arranging a spreader in a battery swapping station for performing a top battery swapping, a battery swapping station of adopting a chassis battery swapping occupies a smaller ground area and lowers the cost of building a station.

Preferably, the mounting bracket is arranged at the groove bottom of the groove.

In the present solution, the above-mentioned structural form is adopted, so that a force borne by the mounting bracket is in the same direction as the extending direction of the mounting bracket itself, so that the mounting bracket is not easily deformed because of bearing the force, and in turn having a longer service life.

Preferably, a pair of side walls of the groove constitutes the mounting bracket, and two ends of the hanging member are respectively connected to the pair of side walls of the groove.

In the present solution, the above-mentioned structural form is adopted, two ends of the hanging member are fixed by a pair of side walls of the groove respectively, so that the connection between the hanging member and the locking mechanism on the longitudinal beam is stabler, and the fixing manner of using side walls of the groove is simpler.

Preferably, the top hanging type battery pack comprises at least two of the mounting brackets, and positions for arranging the mounting brackets in the groove are in one-to-one correspondence to positions of the locking mechanisms of the longitudinal beam.

In the present solution, the above-mentioned structural form is adopted, by means of the mounting brackets and the locking mechanisms are arranged in one-to-one correspondence, so that the top hanging type battery pack and the longitudinal beam have more connecting points in between, so that the stability of connection between the top hanging type battery pack and the longitudinal beam is better. Moreover, when the top hanging type battery pack is mounted on the longitudinal beam, bearing an acting force between the hanging members and the locking mechanisms by a plurality of the mounting brackets, so that an acting force borne by the top hanging type battery pack is more uniform.

Preferably, the mounting bracket comprises a pair of upright plates erected in the groove, and two ends of the hanging member are respectively connected to the upright plates.

In the present solution, the above-mentioned structural form is adopted to satisfy of fixing two ends of the hanging member and ensuring that the mounting bracket is not easily deformed because of bearing a force, at the same time, the structure is simple and compact.

Preferably, the tops of opposite end surfaces of at least a pair of the upright plates are inclinedly arranged with first inclined guiding surfaces, the first inclined guiding surfaces of the upright plates are gradually moving away from each other along a direction that the upright plates are away from the groove bottom of the groove.

In the present solution, the above-mentioned structural form is adopted, when during mounting the top hanging type battery pack on the longitudinal beam, the longitudinal beam gradually enters the groove, the locking mechanism on the longitudinal beam gradually enters between the two upright plates, the first inclined guiding surface on the upright plate can locate and guide a position of the battery pack box at the horizontal direction, so that the locking mechanism on the longitudinal beam can smoothly dive between the two vertical plates and realize the locking with the hanging member.

Preferably, the mounting bracket further comprises a reinforcing plate, the reinforcing plate is respectively connected to two of the upright plates.

In the present solution, the above-mentioned structural form is adopted to strengthen the structural strength of the upright plate and prevent the upright plate from an eversion as bearing an excessive force.

Preferably, an end of the upright plate away from the groove bottom of the groove is arranged with a first snap slot, the reinforcing plate is arranged with a second snap slot snap-fitting to the first snap slot, and the reinforcing plate is snap-fitted to a pair of the upright plates by means of the first snap slot and the second snap slot.

In the present solution, the above-mentioned structural form is adopted to steadily connect the reinforcing plate to the upright plate, and facilitating a mounting and dismounting, at the same time, can effectively prevent a situation that the reinforcing plate rolls over.

Preferably, the reinforcing plate and the hanging member are arranged on the upright plate at intervals.

In the present solution, the above-mentioned structural form is adopted, the reinforcing plate will not affect the locking function between the hanging member and the locking mechanism, but it can reinforce the entire structure of the mounting bracket, so that the connection of the top hanging type battery pack and the longitudinal beam is steadier.

Preferably, the mounting bracket further comprises a connecting plate, and the upright plate is arranged to the groove bottom of the groove by means of the connecting plate.

In the present solution, the above-mentioned structural form is adopted, thereby a force borne at a position of the hanging member will be more evenly transmitted to the battery pack box by means of the upright plate and the connecting plate in sequence, so that the structural stability is better; at the same time, a connecting area is increased, so that the connection of the mounting bracket and the battery pack box is more steady and the mounting is more convenient at the same time.

Preferably, a position of the connecting plate corresponding to the upright plate is arranged with a plug-in hole, a position of the upright plate corresponding to the plug-in hole is arranged with an plug-in block matching the shape of the plug-in hole, the upright plate is arranged to the connecting plate by means of the plug-in hole and the plug-in block.

In the present solution, the above-mentioned structural form is adopted to ensure the stability of the connection between the upright plate and the connecting plate as a premise, also consider the efficiency of mounting, comparing to the integral molding process, such a structure does not need to be remolded, which saves costs.

Preferably, a first position adjusting hole is arranged on the connecting plate, a second position adjusting hole is arranged at a position corresponding to the first position adjusting hole on the battery pack box, the first position adjusting hole and the second position adjusting holes are arranged in one-to-one correspondence, and the first position adjusting hole and/or the second position adjusting hole are waist holes, the length direction of the waist hole is the width direction of the battery pack box, the first position adjusting hole is detachably connected to the second position adjusting hole by means of a connecting assembly.

In the present solution, the above-mentioned structural form is adopted to prevent the top hanging type battery pack being unable to realize the locking with the locking mechanism on the longitudinal beam when it is hanged on the longitudinal beam of the electric vehicle due to processing errors.

Preferably, a reinforcing beam is arranged at a position corresponding to the mounting bracket in the battery pack box, and the mounting bracket is connected on the reinforcing beam.

In the present solution, the above-mentioned structural form is adopted, a reinforcing beam is added and arranged in the battery pack box to connect the mounting bracket, improving an entire strength of the top hanging type battery pack, preventing the mounting bracket to detach from the battery pack box as bearing an excessive force, and increasing a service life of the hanging battery pack.

Preferably, the mounting bracket and the battery pack box have a sealing member in between.

In the present solution, the above-mentioned structural form is adopted to effectively prevent water from flowing into the battery pack box, improving a sealability of the battery pack box, and in turn reducing a possibility that battery cells in the battery pack box are damaged.

Preferably, there are two reinforcing beams, and the reinforcing beams divide the inner space of the battery pack box into at least three battery cell accommodating cavities for placing battery cells.

In the present solution, the above-mentioned structural form is adopted to separate some battery cells from some battery cells, improving the safety and stability of the top hanging type battery pack, at the same time, more facilitating the mounting of the battery cells.

Preferably, the reinforcing beam is arranged with a wire slot for routing cables, and the battery cell accommodating cavities at two sides of the reinforcing beam are communicated by means of the wire slot.

In the present solution, the above-mentioned structural form is adopted, so that the battery cells in the adjacent battery cell accommodating cavities are electrically connected by means of cables, and the mounting and connection are very convenient.

Preferably, several of the battery cell accommodating cavities are sequentially arranged at intervals along the horizontal direction.

In the present solution, the above-mentioned structural form is adopted to increase spaces arranged by the battery cell accommodating cavities, further increase capacities of the battery cells, realizing a longer travel distance of the electric vehicle, reducing numbers of replacing of the electric vehicle, and having a higher space utilization rate.

Preferably, several of the battery cell accommodating cavities comprise a plurality of side battery cell accommodating cavities, and the plurality of the side battery cell accommodating cavities are distributed to two sides of the groove.

In the present solution, the above-mentioned structural form is adopted to make full use of spaces at two sides of the longitudinal beam, the space utilization rate is higher, and the battery cell capacity in the battery pack box is increased.

Preferably, several of the battery cell accommodating cavities further comprises a middle battery cell accommodating cavity, the middle battery cell accommodating cavity is arranged at a central area of the battery pack box, a plurality of the side battery cell accommodating cavities are distributed at two sides of the middle battery cell accommodating cavity, and the groove is formed in between the middle battery cell accommodating cavity and the side battery cell accommodating cavity.

In the present solution, the above-mentioned structural form is adopted to further make full use of spaces of the longitudinal beam of the electric vehicle, realizing that the battery cells can be mounted to two sides and the middle of the longitudinal beam respectively, realizing a higher space utilization rate, and increasing the battery cell capacity in the battery pack box. At the same time, the groove is positioned between the middle cell accommodating cavity and the side cell accommodating cavities, which facilitates the arrangement of the groove.

Preferably, the height of the middle battery cell accommodating cavity is smaller than the height of the side battery cell accommodating cavity.

In the present solution, the above-mentioned structural form is adopted to further make full use of spaces in the height direction of the electric vehicle, realizing a higher space utilization rate, and increasing the battery cell capacity in the battery pack box.

Preferably, the battery pack box comprises a box body and a box cover, the groove is arranged at the top of the box body, and the top of the box body is also arranged with several openings, the box cover covers the opening of the box body, and the box body, the box cover, and the reinforcing beam jointly constitute the battery cell accommodating cavity.

In the present solution, the above-mentioned structural form is adopted to make it more convenient to take the battery cells from the battery cell accommodating cavity, the battery cells in the box body are covered by means of the box cover to prevent the battery cells from being exposed to the air and to improve the safety of the top hanging type battery pack.

Preferably, the groove is positioned between two of the openings that are adjacent.

In the present solution, the above-mentioned structural form is adopted, a structural space between the openings is reused, realizing a compact structure of the top hanging type battery pack and a high space utilization rate.

Preferably, the bottom of the battery pack box is arranged with an unlock guiding hole for an unlocking mechanism of a battery swapping apparatus to pass through, and the length direction of the unlock guiding hole is parallel to the width direction of the battery pack box, the unlock guiding hole penetrates from the bottom of the battery pack box to the groove, and the unlock guiding hole is arranged at a position corresponding to the lock connecting rod of the locking mechanism.

In the present solution, the above-mentioned structural form is adopted, the unlocking rod on the battery swapping apparatus will penetrate through the unlock guiding hole and act a force on the lock connecting structure or the locking mechanism to realize the unlocking, so that realizing the unlocking is very convenient.

Preferably, the bottom of the battery pack box is further arranged with a position guiding groove for a positioning structure of the battery swapping apparatus to pass through, and the length direction of the position guiding groove is parallel to the width direction of the battery pack box.

In the present solution, the above-mentioned structural form is adopted, before the battery swapping apparatus enters the unlock guiding hole, first aligning the battery swapping apparatus and the battery pack by the position guiding groove and the positioning structure, thereby reducing an amount of situation of misalignment of the battery swapping apparatus with the unlock guiding hole.

Preferably, around a lower end side wall of the position guiding groove is inclinedly arranged with a second inclined guiding surface, and along the bottom-up direction, the second inclined guiding surface gradually approaches.

In the present solution, the above-mentioned structural form is adopted, when the battery swapping apparatus passes by the position guiding groove, the battery swapping apparatus will move along with the trend of the second inclined guiding surface of the position guiding groove, thereby realize to guide the alignment of the unlocking mechanism with the unlock guiding hole.

An electric vehicle, it comprises a longitudinal beam and the top hanging type battery pack according to any one of the above-mentioned items, the locking mechanism is arranged on the longitudinal beam, and the top hanging type battery pack is detachably connected to the locking mechanism by means of the lock connecting structure.

In the present solution, the above-mentioned structural form is adopted to design a battery pack mounted on a longitudinal beam of an electric vehicle, when the top hanging type battery pack is mounted on the electric vehicle, the center of gravity of the battery pack is relatively low and is located under the longitudinal beam, thereby lower the center of gravity of the entire electric vehicle and improve the stability for driving the electric truck, at the same time, the battery pack will not occupy the space behind the driver, improving the driving experience or freeing more space up for the electric vehicle to carry more goods.

Preferably, the locking mechanism is arranged with a through groove for the hanging member to pass through.

In the present solution, the above-mentioned structural form is adopted, when the top hanging type battery pack is mounted on the longitudinal beam, the hanging member realizes the locking of the lock connecting structure and the locking mechanism by means of the through groove arranged to pass through the locking mechanism, and the stability of connection is fine.

Preferably, the locking mechanism comprises a primary lock, the primary lock comprising at least two primary lock bases, at least two primary lock tongues, and a lock connecting rod, the through groove comprising a primary lock groove, the primary lock base is arranged with the primary lock groove that is horizontally penetrating and is in an inverted L shape, and the primary lock bases and the primary lock tongues are arranged in one-to-one correspondence;

the primary lock base is arranged on the longitudinal beam, a first end of the primary lock tongue is rotatably connected to the primary lock base, and a second end of the primary lock tongue is rotatably connected to the lock connecting rod;

at least some of the hanging members of the top hanging type battery pack pass through the primary lock groove;

when the lock connecting rod bears an acting force of an unlocking mechanism of a battery swapping apparatus, the lock connecting rod drives the primary lock tongue to rotate and open an opening of the primary lock groove, and the hanging members enter or leave the primary lock groove by means of the opening of the primary lock groove.

In the present solution, the above-mentioned structural form is adopted, the longitudinal beam and the top hanging type battery pack are connected by using the primary lock, the stability of connection between the longitudinal beam and the top hanging type battery pack is high and steady.

Preferably, the locking mechanism further comprises a supporting base, the through groove further comprising a supporting groove, the supporting base is arranged with the supporting groove that is horizontally penetrating and is in an inverted L shape, and some of the hanging members of the top hanging type battery pack are arranged to pass through the supporting groove.

In the present solution, the above-mentioned structural form is adopted to increase the amount of connecting points of the top hanging type battery pack and the locking mechanism, so that the top hanging type battery pack is more steadily connected to the electric vehicle.

Preferably, the electric vehicle further comprises a fixing bracket, the fixing bracket is a plate-shaped structure, the fixing bracket is arranged to side walls of the longitudinal beam or the bottom of the longitudinal beam, and the locking mechanism is connected to the longitudinal beam by means of the fixing bracket.

In the present solution, the above-mentioned structural form is adopted to increase the connecting area of the locking mechanism and the longitudinal beam, so that an acting force borne by the locking mechanism is more uniformly transmitted to the longitudinal beam.

Preferably, the fixing bracket comprises a first plate body and a second plate body connected in sequence, the first plate body and the second plate body are perpendicular to each other, the first plate body is connected to side walls of the longitudinal beam, the locking mechanism is arranged on the second plate body and extends downward, and the connecting point of the locking mechanism and the lock connecting structure is located above a lower end of the longitudinal beam.

In the present solution, the above-mentioned structural form is adopted, under a situation that the connecting area of the locking mechanism and the longitudinal beam is ensured, when the top hanging type battery pack is mounted on the electric vehicle, due to the height of the connecting point of the locking mechanism and the lock connecting structure is raised above a lower surface of the longitudinal beam of the vehicle body, can entirely increase the height of the top hanging type battery pack, and further provide spaces in the height direction for the battery swapping apparatus to perform a battery swapping.

A positive progressive effect of the present application is: by means of arranging the groove penetrating along the width direction of the battery pack on the top of the top hanging type battery pack, the battery pack moves to a battery swapping location below the longitudinal beam, by means of moving the battery pack upward, realizing an embedding of the longitudinal beam into the groove, the battery pack is connected to the locking mechanisms on two of the longitudinal beams by means of the lock connecting structure in the groove, specifically by means of connecting the hanging member of the lock connecting structure to the locking mechanisms on two of the longitudinal beams, thereby realizing a mounting of the battery pack on the longitudinal beams, and due to the groove is front-rear penetrated, so that a connecting range of the top hanging type battery pack and the longitudinal beam is larger. The top hanging type battery pack and the electric vehicle can perform a chassis battery swapping, and the center of gravity of the battery pack is positioned below the longitudinal beam, thereby lower the center of gravity of the electric vehicle and improve the stability for driving the electric truck, at the same time, the battery pack will not occupy the space behind the driver, improving the driving experience or freeing more space up for the electric vehicle to carry more goods.

DETAILED DESCRIPTION OF THE PREFERRED EMBODIMENT

The present application is further described by means of a manner of embodiments at below, but the present application is not therefore limited to scopes of the embodiments.

Embodiment 1

Figure 1:
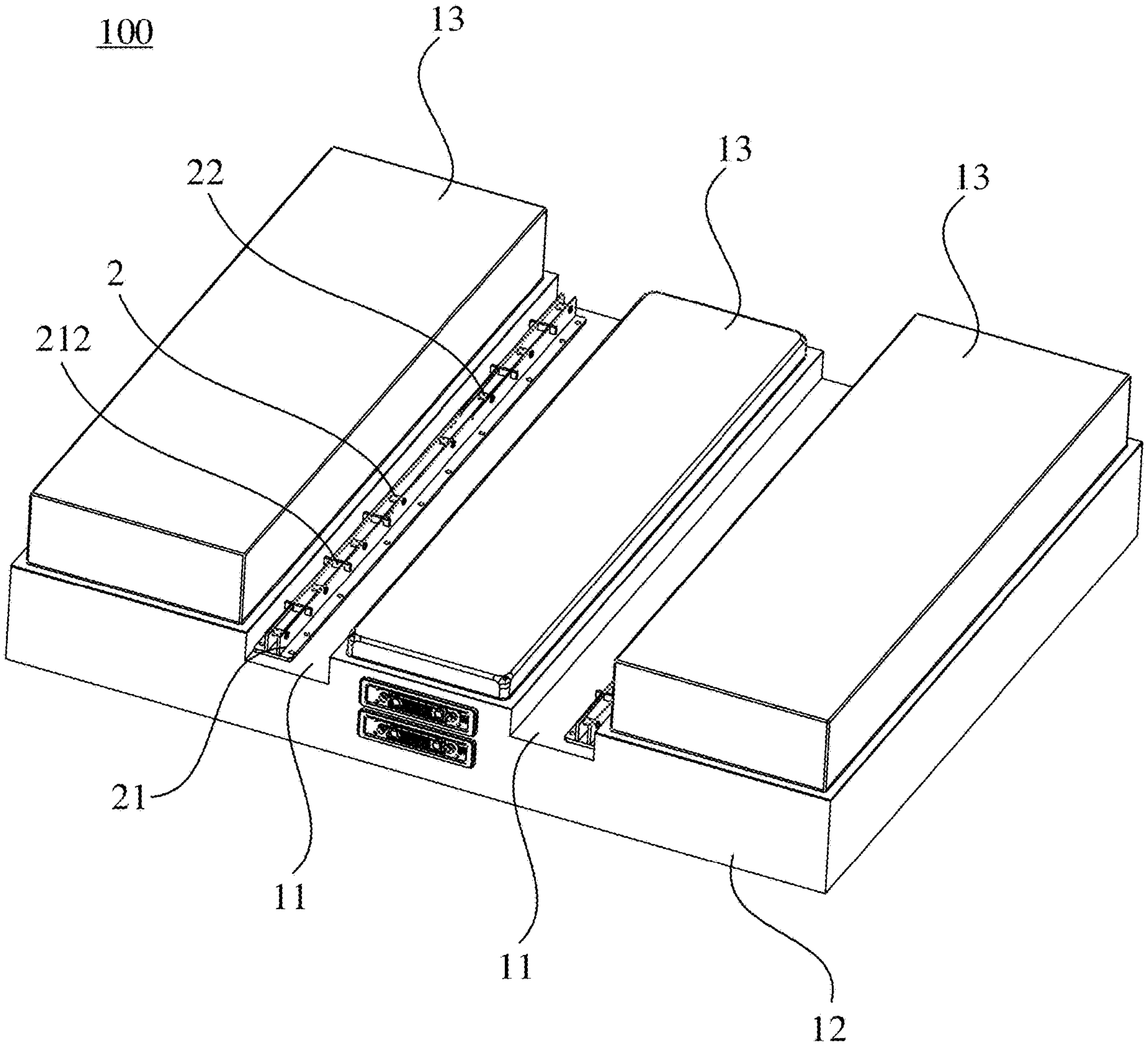
FIG. 1 is a structural schematic diagram of a top hanging type battery pack of embodiment 1 of the present application.
Figure 2:
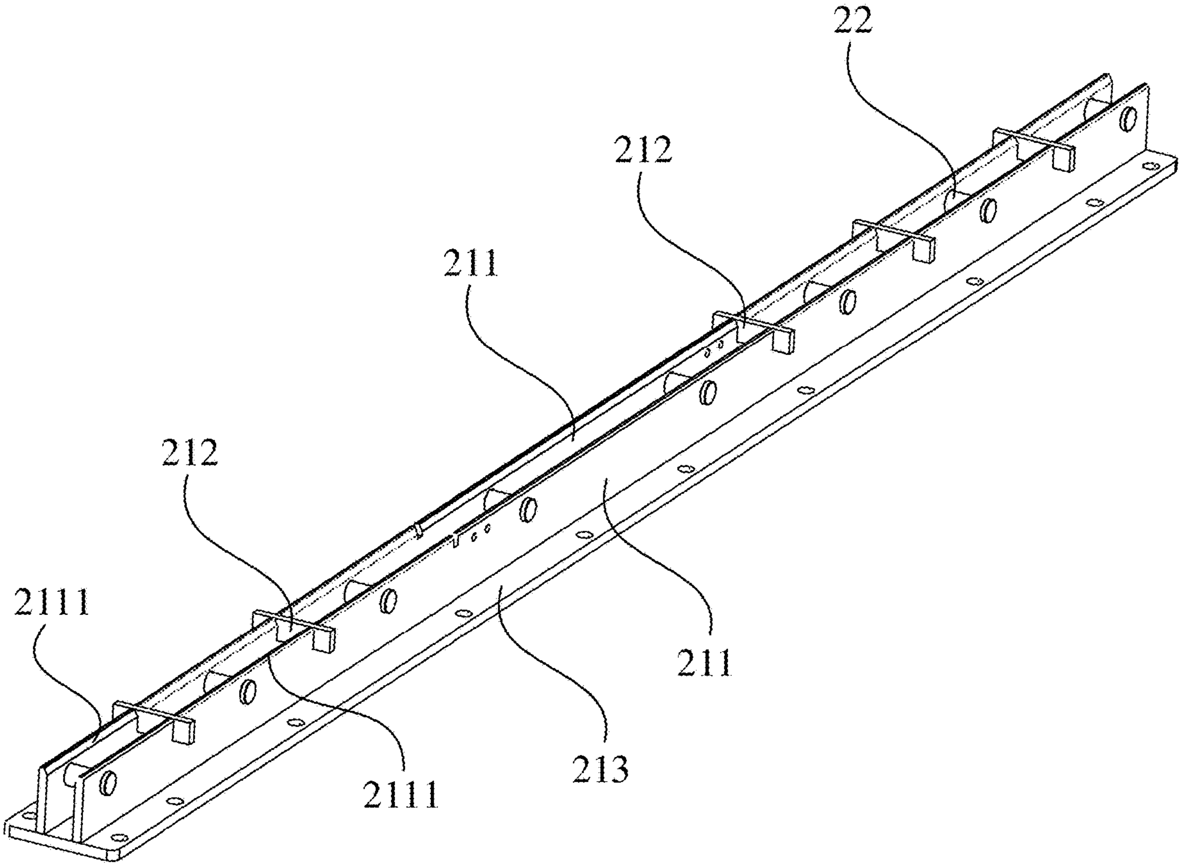
FIG. 2 is a structural schematic diagram of a position at a mounting bracket and lock connecting structures of FIG. 1.
Figure 6:
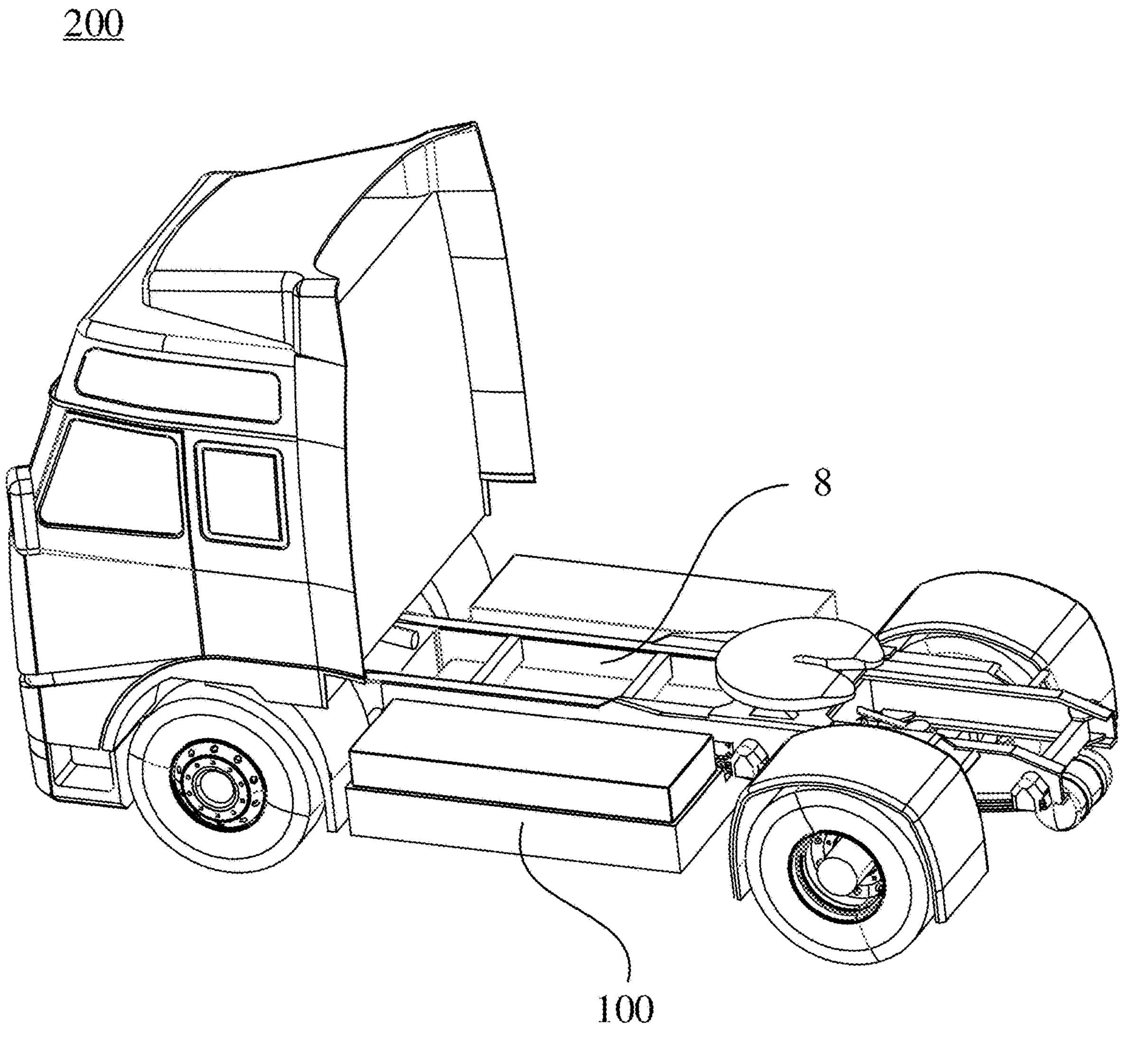
FIG. 6 is a structural schematic diagram of an electric vehicle of embodiment 2 of the present application.

As shown in FIG. 1, FIG. 2, and FIG. 6, the present application discloses a top hanging type battery pack, the top hanging type battery pack 100 is detachably connected to a locking mechanism 3 of a longitudinal beam 8 of an electric vehicle 200, the top hanging type battery pack 100 comprising a battery pack box 1 and a lock connecting structure 2; the lock connecting structure 2 comprising a mounting bracket 21 and several of horizontally arranged hanging members 22, at least one end of several of the hanging members 22 is connected to the mounting bracket 21; groove 11 facing the battery pack box 1 is arranged to the top of the battery pack box 1 at a position corresponding to the longitudinal beam 8, the mounting bracket 21 is arranged in the groove 11, and the battery pack box 1 is detachably connected to the longitudinal beam 8 by means of cooperations between several of the hanging members 22 and the locking mechanism 3.

By means of arranging the groove 11 penetrating along the width direction of the battery pack 100 on the top of the battery pack 100, the battery pack 100 moves to a battery swapping location below the longitudinal beam 8, by means of moving the battery pack 100 upward, realizing an embedding of the longitudinal beam 8 into the groove 11, the battery pack 100 is connected to the locking mechanisms 3 on two of the longitudinal beams 8 by means of the lock connecting structure 2 in the groove 11, specifically by means of connecting the hanging member 22 of the lock connecting structure 2 to the locking mechanisms 3 on two of the longitudinal beams 8, thereby realizing a mounting of the battery pack 100 on two of the longitudinal beams 8, and due to the groove 11 is penetrated, so that a connecting range of the battery pack 100 and the longitudinal beam 8 is larger. Reversely, realizing a dismounting of the battery pack 100 from two of the longitudinal beams 8. Realizing a chassis battery swapping by using two of the longitudinal beams 8 of the electric vehicle 200, and realizing of positioning the center of gravity of the battery pack 100 below the longitudinal beam 8, improving the steady and safety of the vehicle by a large extent; at the same time, the structure is compact and the space utilization rate is high.

In the present embodiment, two ends of the hanging member 22 of the lock connecting structure 2 are connected and fixed to the mounting bracket 21, so that the structural strength of the lock connecting structure 2 is stronger, and the hanging member 22 in the present embodiment is a lock shaft.

Figure 3:
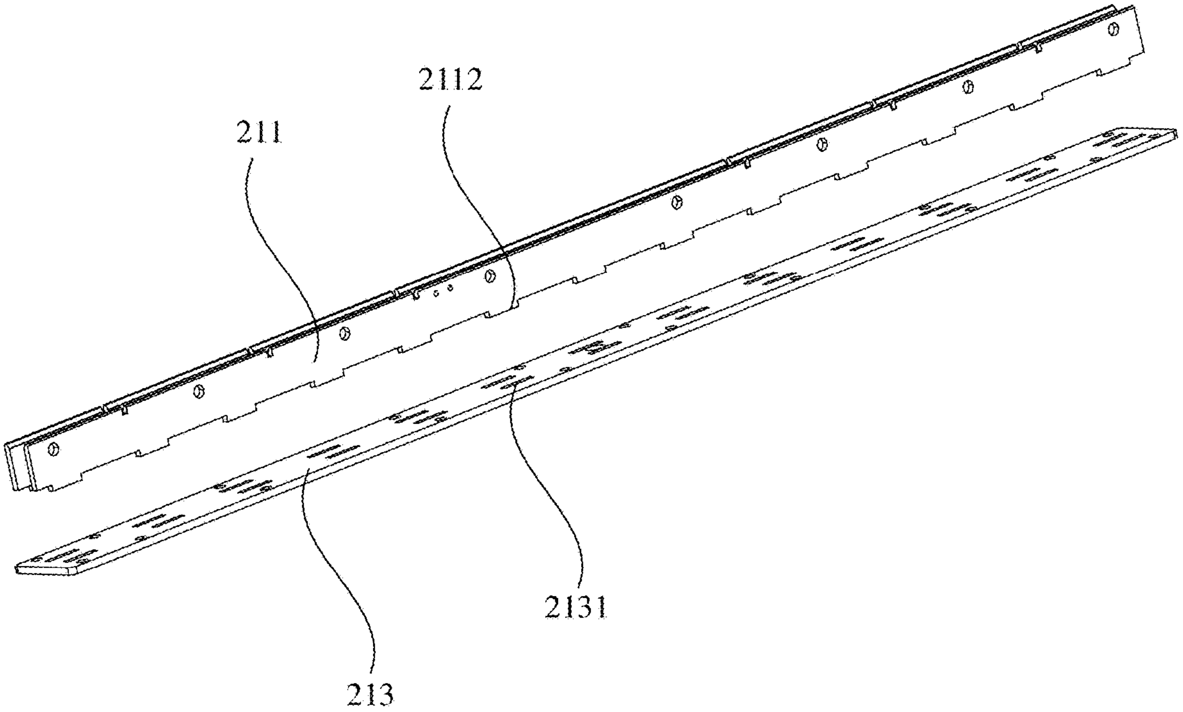
FIG. 3 is an exploded schematic diagram of the mounting bracket of FIG. 2.

Specifically, as shown in FIGS. 2 and 3, the mounting bracket 21 is arranged with a through hole for a lock shaft to pass through, an end of the lock shaft is a protruded structure and abuts an outer wall of the mounting bracket 21, after another end of the lock shaft passes through another outer wall of the mounting bracket 21 that is opposite to the aforementioned outer wall, and it is fixedly connected by a snap spring or a positioning pin. When adopting a positioning pin, another end of the lock shaft is arranged with a pin hole, another end of the lock shaft is connected to another outer wall by means of passing the positioning pin through the pin hole.

In other specific implementation manners, the hanging member 22 of the lock connecting structure 2 is a cantilever beam structure with a single end connected to the mounting bracket 21.

As shown in FIG. 1, the mounting bracket 21 is arranged at the groove bottom of the groove 11. Due to that the hanging member 22 is arranged parallel to the bottom of the groove 11, therefore, the mounting bracket 21 extends upward from the groove bottom of the groove 11, which can more conveniently fix two ends of the hanging member 22. Moreover, comparing to extending the mounting bracket 21 laterally from side walls of the groove 11 to fix two ends of the hanging member 22, a force borne by the mounting bracket 21 extending upward from the groove bottom of the groove 11 is in the same direction as the extending direction the mounting bracket 21 itself, so that the mounting bracket 21 is not easily deformed because of bearing the force, and in turn having a longer service life. While the mounting bracket 21 extending laterally from side walls of the groove 11 will deform because of bearing the downward gravity force of the battery pack 100 for a long time.

The top hanging type battery pack 100 comprises at least two of the mounting brackets 21, and positions for arranging the mounting brackets 21 in the groove 11 are in one-to-one correspondence to positions of the locking mechanisms 3 of the longitudinal beam 8. By means of the mounting brackets 21 and the locking mechanisms 3 are arranged in one-to-one correspondence, so that the top hanging type battery pack 100 and the longitudinal beam 8 are having more connecting points in between, so that the stability of connection between the top hanging type battery pack 100 and the longitudinal beam 8 is better. Moreover, when the top hanging type battery pack 100 is mounted on the longitudinal beam 8, bearing an acting force between the hanging members 22 and the locking mechanisms 3 by a plurality of the mounting brackets 21, so that an acting force borne by the top hanging type battery pack 100 is more uniform. In the present embodiment, the number of the mounting brackets 21 and the locking mechanisms 3 are both two, the number of the grooves 11 is arranged to be two, two of the mounting brackets 21 are respectively arranged in two of the grooves 11 that are arranged corresponding to the longitudinal beam 8.

Specifically, when mounting, first mount several of the hanging member 22 on the mounting bracket 21 and form a whole piece, then mount and arrange the entire mounting bracket 21 on the battery pack box 1, which facilitates the mounting, and the mounting precision is high.

As shown in FIG. 2, the mounting bracket 21 comprises a pair of upright plates 211 erected in the groove 11, and two ends of the hanging member 22 are respectively connected to the upright plates 211. Specifically, the number of the upright plates 211 is two, and two of the upright plates 211 are arranged at intervals, and two of the upright plates 211 are arranged perpendicular to the groove bottom of the groove 11, two ends of the hanging member 22 are respectively fixed by means of two of the upright plates 22 that are arranged at intervals, satisfing of fixing two ends of the hanging member 22 and that the mounting bracket 21 is not easily deformed because of bearing a force, at the same time, the structure is simple and compact.

In some other implementation manners, a pair of side walls of the groove 11 constitutes the mounting bracket 21, and two ends of the hanging member 22 are respectively connected to the pair of side walls of the groove 11. Using a pair of side walls of the groove 11 can also realize fixing two ends of the hanging member 22, and the structure is simpler of the fixing manner of using the side walls of the groove 11.

The tops of opposite end surfaces of at least a pair of the upright plates 211 are inclinedly arranged with first inclined guiding surfaces 2111, that is, tops of a right end surface of the upright plate 211 at the left side and a left end surface of the upright plate 211 at the right side in FIG. 2 are arranged with first inclined guiding surfaces 2111, the the first inclined guiding surfaces 2111 of the upright plates 211 are gradually moving away from each other along a direction that the upright plates 211 are away from the groove bottom of the groove 11. Specifically, the first inclined guiding surface 2111 is arc-shaped, by means of respectively arranging two of the first inclined guiding surfaces 2111 that are arc-shaped on the tops of opposite end surfaces of the two upright plates 211, when the battery pack 100 rises, the longitudinal beam 8 gradually enters the groove 11, the locking mechanism 3 on the longitudinal beam 8 gradually enters between the two upright plates 211, the first inclined guiding surface 2111 on the upright plate 211 can locate and guide a position of the battery pack box 1 at the horizontal direction, so that the locking mechanism 3 on the longitudinal beam 8 can smoothly dive between the two vertical plates 211 and realize the locking with the hanging member 22. In other specific implementation manners, the first inclined guiding surface 2111 can also be a plane.

In order to improve the structural strength at a position of the mounting bracket 21, the mounting bracket 21 further comprises a reinforcing plate 212, and the reinforcing plate 212 is respectively connected to two of the upright plates 211. Specifically, the reinforcing plate 212 is arranged between two of the upright plates 211, and two ends of the reinforcing plate 212 are respectively connected to two of the upright plates 211. In the present embodiment, a plurality of the reinforcing plates 212 are arranged at intervals along the length direction of the upright plate 211, one is arranged along the height direction of the upright plate 211 and is arranged at the top of the upright plate 211. In other embodiments, a plurality of the reinforcing plates 212 can also be arranged along the height direction of the upright plate 211.

An end of the upright plate 211 away from the groove bottom of the groove 11 is arranged with a first snap slot, the reinforcing plate 212 is arranged with a second snap slot snap-fitting to the first snap slot, and the reinforcing plate 212 is snap-fitted to a pair of the upright plates 211 by means of the first snap slot and the second snap slot. The snap-fitting in the present embodiment is that the upright plate 211 and the reinforcing plate 212 are respectively arranged with the first snap slot and the second snap slot, and the snap-fitting is performed in a form of double snap slots, which can effectively prevent a situation that the reinforcing plate 212 rolls over, and at the same time, it can also make the connection between the upright plate 211 and the reinforcing plate 212 more steady.

The reinforcing plate 212 and the hanging member 22 are arranged on the upright plate 211 at intervals. Due to arranging the reinforcing plate 212 at intervals can make the reinforcing effect of the reinforcing plate 212 be more uniform, so that the entire structural strength of the upright plate 211 is stronger; at the same time, it can prevent an interference of the locking mechanism 3 and the reinforcing plate 212 when the hanging member 22 is locking with the locking mechanism 3. The present embodiment intersectively arranges the reinforcing plate 212 and the hanging member 22 to the upright plate 211 at intervals, so that the structural strength is stronger and the connection is steadier at the same time.

The mounting bracket 21 further comprises a plate-shaped connecting plate 213, the upright plate 211 is arranged at the groove bottom of the groove 11 by means of the connecting plate 213. Specifically, the connecting plate 213 is arranged to the groove bottom of the groove 11 and attached to the groove bottom, two of the upright plates 211 are both perpendicularly connected to the connecting plate 213, thereby a force borne at a position of the hanging member 22 will be more uniformly transmitted to the battery pack box 1 by means of the upright plate 211 and the connecting plate 213 in sequence, so that the structural stability is better. And comparing to connect the upright plate 211 directly to the groove bottom of the groove 11, the connecting plate 213 is arranged in between the upright plate 211 and the groove bottom, the connection area is increased by means of connecting the connecting plate 213 to the groove bottom, so that the connection of the mounting bracket 21 and the battery pack box 1 is more steady and the mounting is more convenient at the same time; on the other hand, connecting the upright plate 211 and the battery pack box 1 by means of the connecting plate 213, the connecting plate 213 can disperse some of the borne force, thereby effectively reducing a deformation generated to the groove bottom of the groove 11 because of the weight of the battery pack 100.

As shown in FIG. 3, specifically, a position of the connecting plate 213 corresponding to the upright plate 211 is arranged with a plug-in hole 2131, a position of the upright plate 211 corresponding to the plug-in hole 2131 is arranged with an plug-in block 2112 matching the shape of the plug-in hole 2131, the upright plate 211 is welded after a plugging in by means of the plug-in hole 2131 and the plug-in block 2112, eventually realizing a connection to the connecting plate 213. The upright plate 211 and the connecting plate 213 are connected by means of a cooperation of the plug-in hole 2131 and the plug-in block 2112, thereby at the same time of realizing the stability of connection of the upright plate 211 and the connecting plate 213, also realizing a simpler and more convenient form of plugging-in during mounting. In other embodiments, the connection manner between the upright plate 211 and the connecting plate 213 can also be screw connection, snap connection, buckle connection, hook connection, or tenon connection.

More preferably, a first position adjusting hole is arranged on the connecting plate 213, a second position adjusting hole is arranged at a position corresponding to the first position adjusting hole on the battery pack box 1, the first position adjusting hole and the second position adjusting holes are arranged in one-to-one correspondence, and the first position adjusting hole and/or the second position adjusting hole are waist holes, the length direction of the waist hole is the width direction of the battery pack box 1, and the first position adjusting hole is detachably connected to the second position adjusting hole by means of a connecting assembly. Specifically, the second position adjusting hole is arranged at the groove bottom of the groove 11 of the battery pack box 1, realizing a performance of adjusting a position of the mounting bracket 21 at the width direction of the groove bottom of the groove 11 of the battery pack box 1 by means of the first position adjusting hole and the second position adjusting hole, thereby preventing the top hanging type battery pack 100 being unable to realize the locking with the locking mechanism 3 on the longitudinal beam 8 when it is hanged on the longitudinal beam 8 of the electric vehicle 200 due to processing errors. Wherein, the connecting assembly used to connect the first position adjusting hole and the second position adjusting hole can be a bolt, a double-ended screw, a latch and the like.

Figure 5:
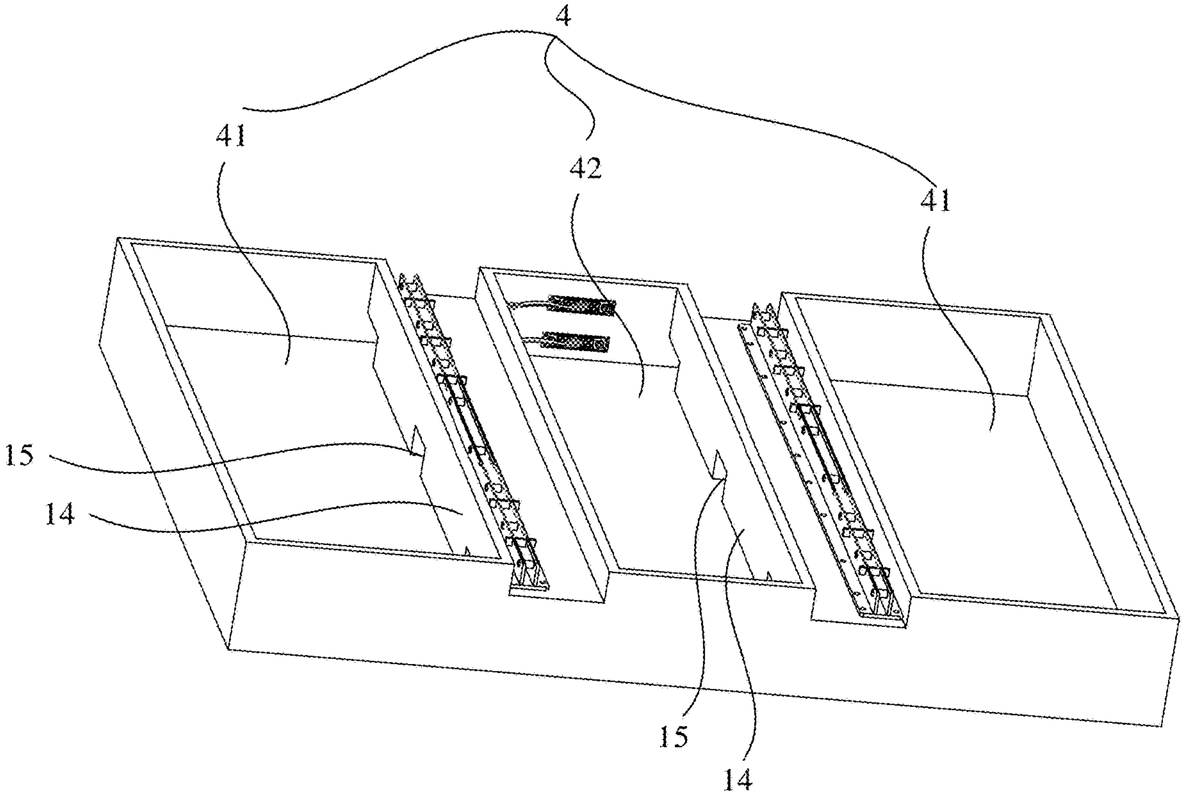
FIG. 5 is an inner structural schematic diagram of FIG. 1.

As shown in FIG. 5, a reinforcing beam 14 is arranged at a position corresponding to the mounting bracket 21 in the battery pack box 1, the mounting bracket 21 is connected to the reinforcing beam 14, in the present embodiment, and the reinforcing beam 14 is a block-shaped structure. The reinforcing beam 14 in the battery pack box 1 provides a function of strengthening the structural strength of the battery pack box 1, after the connecting plate 213 of the mounting bracket 21 is connected to the battery pack box 1 by means of the connecting assembly, it is eventually connected to the reinforcing beam 14 in the battery pack box 1, due to the force borne at a position of the reinforcing beam 14 can be relatively large, comparing to connecting at other positions of the battery pack box 1, connecting at a position of the reinforcing beam 14 improves an entire strength of the top hanging type battery pack 100, preventing the mounting bracket 21 to detach from the battery pack box 1 as bearing an excessive force, and increasing a service life of the hanging battery pack 100.

Furthermore, the mounting bracket 21 and the battery pack box 1 have a sealing member in between. Due to the battery pack 100 will inevitably come into contact with water during the electric vehicle 200 is driving outside, in order to prevent water from entering the battery pack box 1 and damaging the battery cells in the battery pack box 1, the sealing member is arranged at a position of connecting the mounting bracket 21 and the battery pack box 1 to enhance the sealing function, effectively preventing water from flowing into the battery pack box 1 and improving the sealability of the battery pack 100. Specifically, the sealing member can be a sealing ring, a sealing strip, a sealing pad, and the like.

In the present embodiment, there are two reinforcing beams 14, and the reinforcing beams 14 divide the inner space of the battery pack box 1 into at least three battery cell accommodating cavities 4 for placing battery cells. Specifically, two of the reinforcing beams 14 are arranged at equal intervals in the battery pack box 1, and divide the battery pack box 1 into three of the battery cell accommodating cavities 4, separating some battery cells from some battery cells, improving the safety and stability of the top hanging type battery pack 100, at the same time, more facilitating the mounting of the battery cells.

As shown in FIG. 5, the reinforcing beam 14 is arranged with a wire slot 15 for routing cables, and the battery cell accommodating cavities 4 at two sides of the reinforcing beam 14 are communicated by means of the wire slot 15. The battery cell accommodating cavities 4 are cut by the structure of the reinforcing beam 14, and the wire slot 15 arranged on the reinforcing beam 14 is for passing cables, so that the battery cells in the adjacent battery cell accommodating cavities 4 are electrically connected by means of cables, and the mounting and connection are very convenient.

As shown in FIG. 5, several of the battery cell accommodating cavities 4 are sequentially arranged at intervals along the horizontal direction, and several of the battery cell accommodating cavities 4 comprise a plurality of side battery cell accommodating cavities 41 and the plurality of side battery cell accommodating cavities 41 are distributed to two sides of the groove 11. The battery cells placed in a plurality of side battery cell accommodating cavities 41 will be distributed on two sides of the longitudinal beam 8, making full use of spaces at two sides of the longitudinal beam 8, realizing a higher space utilization rate, and increasing the battery cell capacity in the battery pack 100.

In order to further use a space in the height direction at a position of the longitudinal beam 8 of the electric vehicle 200, improving the space utilization rate, and increasing the cell capacity in the battery pack 100, several of the battery cell accommodating cavities 4 further comprises a middle battery cell accommodating cavity 42, the middle battery cell accommodating cavity 42 is arranged at a central area of the battery pack box 1, a plurality of the side battery cell accommodating cavities 41 are distributed at two sides of the middle battery cell accommodating cavity 42, and the groove 11 is formed in between the middle battery cell accommodating cavity 42 and the side battery cell accommodating cavity 41, and the height of the middle battery cell accommodating cavity 42 is smaller than the height of the side battery cell accommodating cavity 41.

Wherein, the groove 11 is used to avoid the longitudinal beam 8. When the battery pack 100 is moving to a battery swapping location under the longitudinal beam 8, making the opening of the groove 11 aligned with the longitudinal beam 8, and the battery pack 100 will move upward along the vertical direction, realizing of embedding the longitudinal beam 8 into the groove 11, the structure is compact, the space utilization rate is high, at the same time, effectively preventing an occasion of interference, and the stability is higher. In the present embodiment, the groove 11 penetrates through the battery pack 100 along the length direction of the electric vehicle 200.

As shown in FIG. 1, in the present embodiment, the battery pack box 1 comprises a box body 12 and a box cover 13, the groove 11 is arranged at the top of the box body 12, and the top of the box body 12 is also arranged with several openings, the box cover 13 covers the opening of the box body 12, and the box body 12, the box cover 13, and the reinforcing beam 14 jointly constitute the battery cell accommodating cavity 4. it is more convenient to take the battery cells from the battery cell accommodating cavity 4, the battery cells in the box body 12 are covered by means of the box cover 13 to prevent the battery cells from being exposed to the air and to improve the safety of the top hanging type battery pack 100. In the present embodiment, the number of the battery cell accommodating cavities 4 is in one-to-one correspondence to the number of the box covers 13.

Wherein, the groove 11 is positioned between two of the openings that are adjacent. Arranging the groove 11 between the openings of two of the battery cell accommodating cavities 4 that are adjacent, a structural space between the openings is reused, realizing a compact structure of the battery pack 100 and a high space utilization rate.

Figure 4:
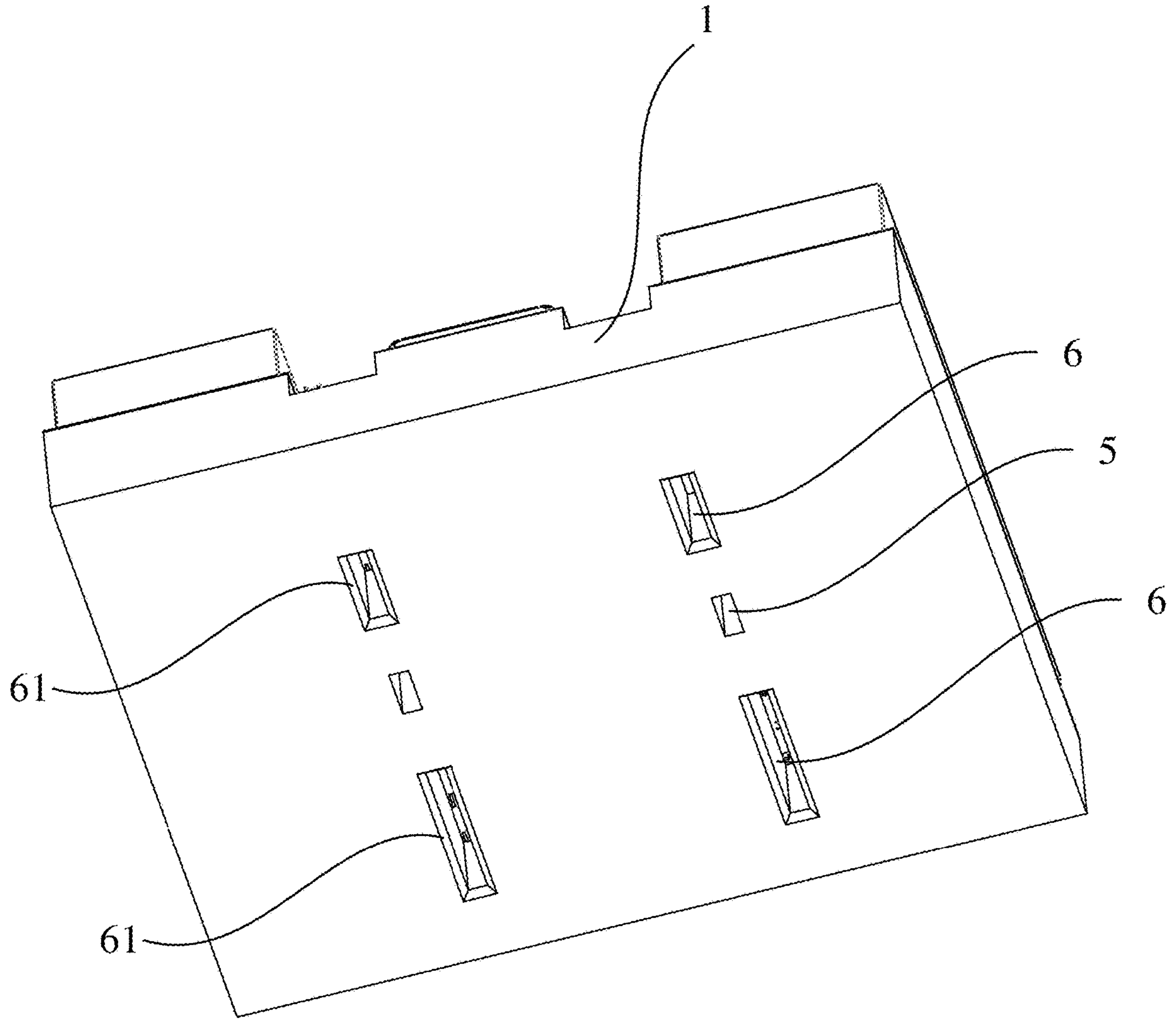
FIG. 4 is a structural schematic diagram of another viewing angle of FIG. 1.

As shown in FIG. 4, the bottom of the battery pack box 1 is arranged with an unlock guiding hole 5 for an unlocking mechanism of a battery swapping apparatus to pass through, and the length direction of the unlock guiding hole 5 is parallel to the width direction of the battery pack box 1, the unlock guiding hole 5 penetrates from the bottom of the battery pack box 1 to the groove 11, the unlock guiding hole 5 is arranged at a position corresponding to the lock connecting rod 323 of the locking mechanism 3. An unlocking rod on the battery swapping apparatus will pass through the unlock guiding hole 5 and act a force on the locking mechanism 3 to realize unlocking. In the present embodiment, the battery swapping apparatus is a battery swapping trolley.

Furthermore, the bottom of the battery pack box 1 is further arranged with a position guiding groove 6 for a positioning structure of the battery swapping apparatus to pass through, and the length direction of the position guiding groove 6 is parallel to the width direction of the battery pack box 1. Before the battery swapping apparatus enters the unlock guiding hole 5, first aligning the battery swapping apparatus and the battery pack 100 by the position guiding groove 6 and the positioning structure, that is using the position guiding groove 6 to realize the positioning of the battery pack 100 and the battery swapping apparatus, thereby prevent a situation of misalignment of the battery swapping apparatus with the unlock guiding hole 5. Wherein, the position guiding groove 6 can be a groove which is up-down penetrating, can also be a sinking groove, that is, a groove which is not up-dawn penetrating.

Around a lower end side wall of the position guiding groove 6 is inclinedly arranged with a second inclined guiding surface 61, and along the bottom-up direction, and the second inclined guiding surface 61 gradually approaches. When the battery swapping apparatus passes by the position guiding groove 6, the battery swapping apparatus will move along with the trend of the second inclined guiding surface 61 of the position guiding groove 6, thereby realize to guide the alignment of the unlocking mechanism with the unlock guiding hole 5. In the present embodiment, the second inclined guiding surface 61 is arc-shaped, and in other specific implementation manners, the second inclined guiding surface 61 can also be a plane.

Embodiment 2

As shown in FIG. 6, the present embodiment also discloses an electric vehicle 200, it comprises a longitudinal beam 8 and the top hanging type battery pack 100 shown in embodiment 1, the locking mechanism 3 is arranged on the longitudinal beam 8, and the top hanging type battery pack 100 is detachably connected to the locking mechanism 3 by means of the lock connecting structure 2. In the present embodiment, the electric vehicle 200 is a commercial vehicle of a heavy-duty truck or a light-duty truck and the like, of course, it can also be applied to a vehicle type of passenger vehicle of a car and the like.

There are two longitudinal beams 8 of the electric vehicle 200, and the top hanging type battery pack 100 realizes the locking by means of the mounting bracket 21 at the top and the locking mechanism 3 on the longitudinal beams 8, thereby the center of gravity of the top hanging type battery pack 100 is positioned below the longitudinal beams 8, thereby lowers the center of gravity of the electric vehicle 200, making the vehicle run more steadily.

Figure 7:
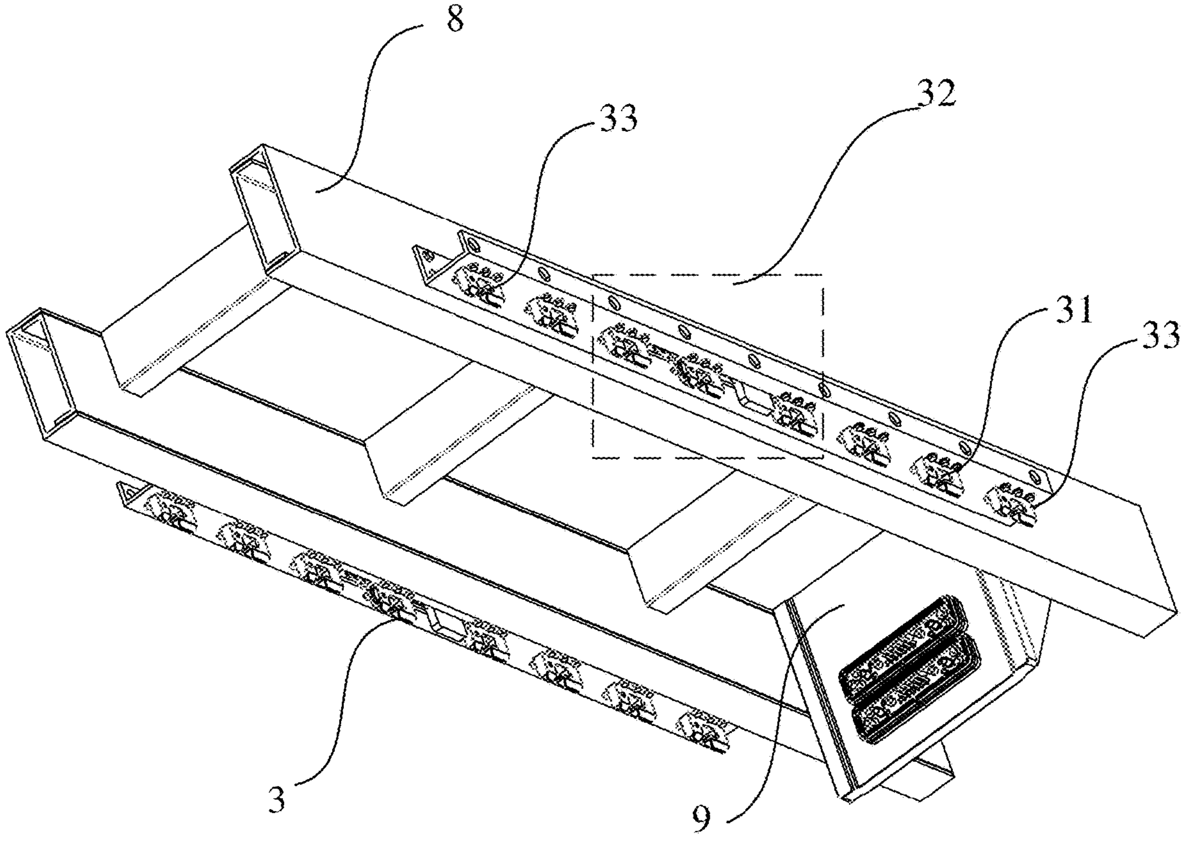
FIG. 7 is a structural schematic diagram of a position at longitudinal beams, fixing brackets, and a locking mechanisms of FIG. 6.

As shown in FIG. 7, due to two ends of the hanging member 22 are both connected to the mounting bracket 21, the locking mechanism 3 is arranged with a through groove 31 for the hanging member 22 to pass through. Specifically, the through groove 31 extends along the width direction of the locking mechanism 3, that is, the Y direction in FIG. 11, due to what is provided for the hanging member 22 to pass through on the locking mechanism 3 is the through groove 31, therefore the hanging member 22 can pass through the locking mechanism 3 and extend out of two sides of the locking mechanism 3.

The locking mechanism 3 will be specifically introduced below.

As shown in FIG. 7, FIG. 9, and FIGS. 11-13, the locking mechanism 3 comprises a primary lock 32, the primary lock 32 comprising three primary lock bases 321, three primary lock tongues 322, and a lock connecting rod 323, the through groove 31 comprising a primary lock groove 325, the primary lock base 321 is arranged with the primary lock groove 325 that is horizontally penetrating and is in an inverted L shape, and the primary lock bases 321 and the primary lock tongues 322 are arranged in one-to-one correspondence; the primary lock base 321 is arranged on the longitudinal beam 8, a first end of the primary lock tongue 322 is rotatably connected to the primary lock base 321, and a second end of the primary lock tongue 322 is rotatably connected to the lock connecting rod 323; some of the hanging members 22 of the top hanging type battery pack 100 pass through the primary lock groove 325; when the lock connecting rod 323 bears an acting force of an unlocking mechanism of a battery swapping apparatus, the lock connecting rod 323 drives the primary lock tongue 322 to rotate and open an opening of the primary lock groove 325, and the hanging members 22 enter or leave the primary lock groove 324 by means of the opening of the primary lock groove 325.

Figure 11:
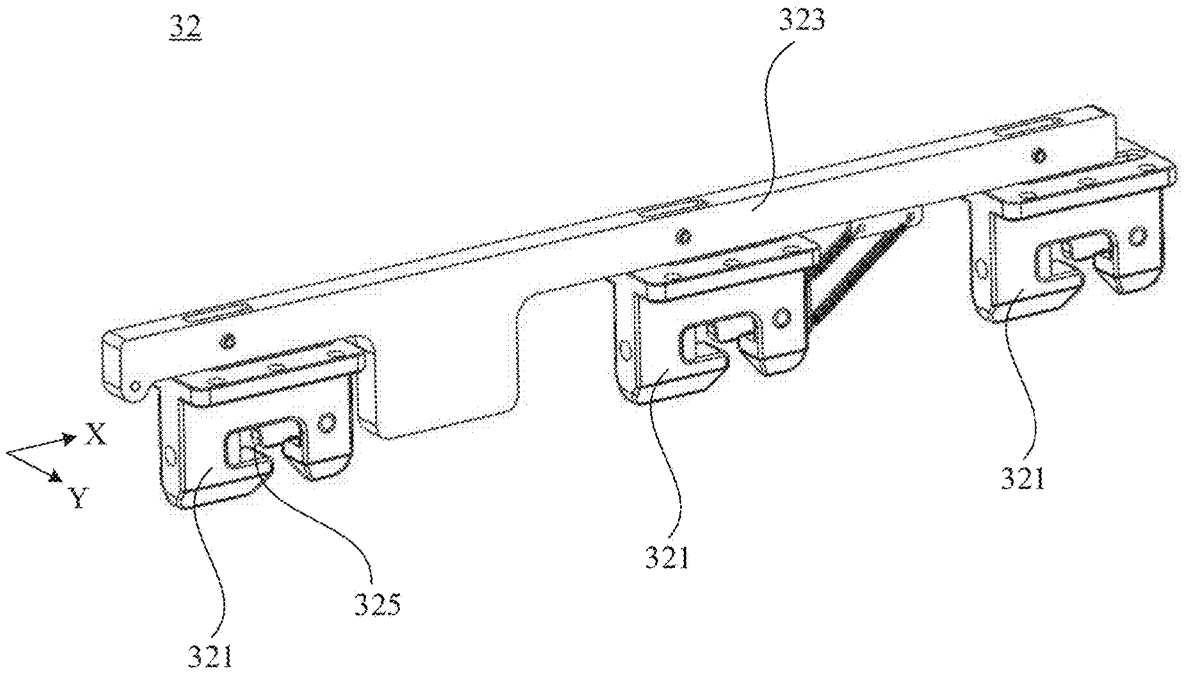
FIG. 11 is a structural schematic diagram of a primary lock of embodiment 2 of the present application.
Figure 12:
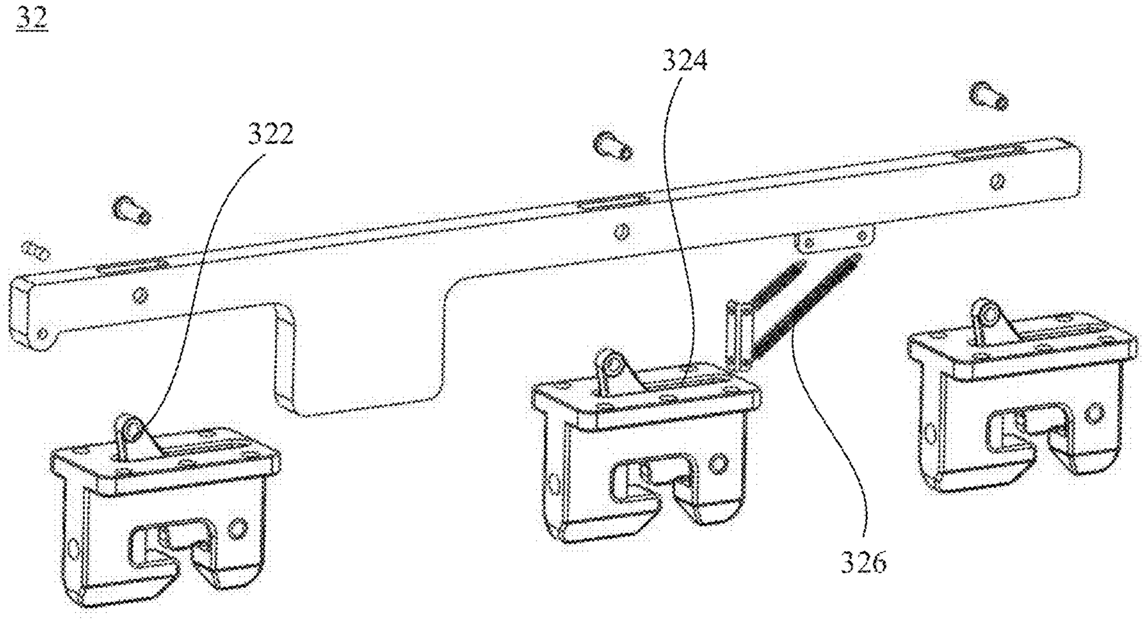
FIG. 12 is an exploded schematic diagram of FIG. 11.
Figure 13:
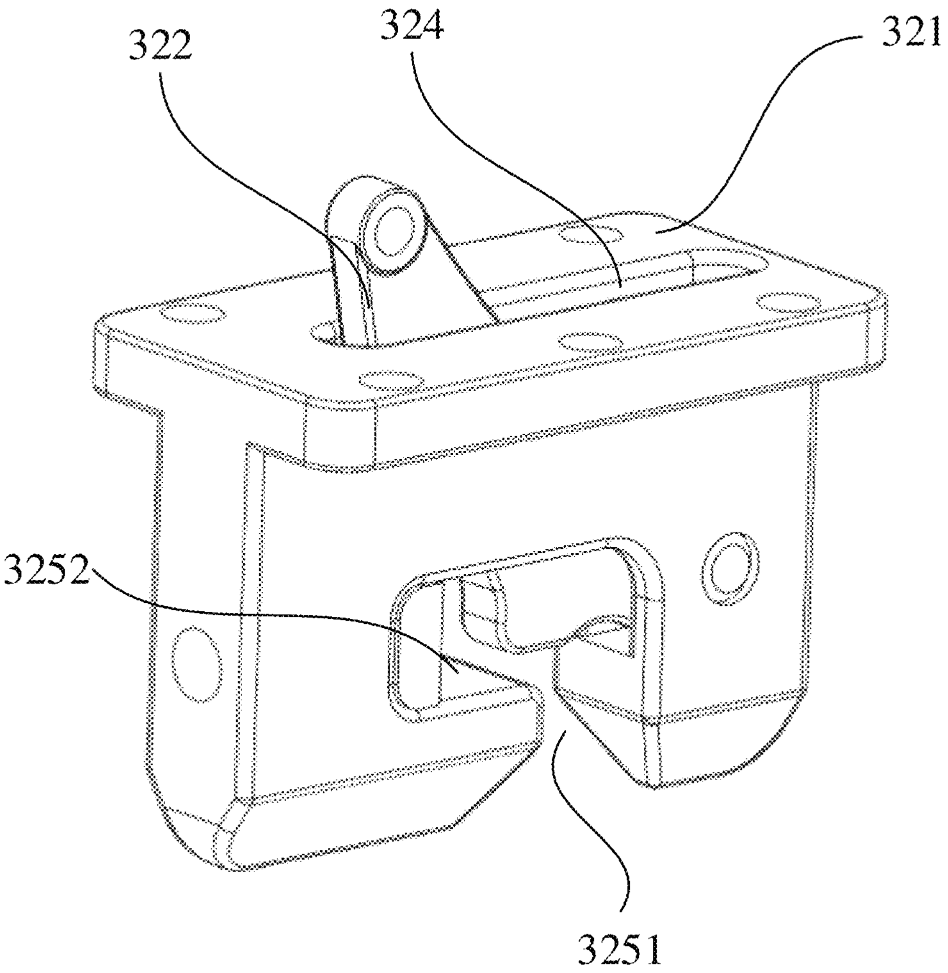
FIG. 13 is a structural schematic diagram of a primary lock base and a primary lock tongue of FIG. 11.

As shown in FIGS. 11 and 12, specifically, the primary lock groove 325 is concave upward from the bottom surface of the primary lock base 321 and penetrates through the front and back surfaces of the primary lock base 321 and is used for the hanging member 22 of the battery pack 100 to enter. The primary lock base 321 is arranged with a lock tongue groove 324 for mounting the primary lock tongue 322, the lock tongue groove 324 is recessed downward from the top surface of the primary lock base 321, the lock tongue groove 324 communicating with the primary lock groove 325, an end of the primary lock tongue 322 passes through the lock tongue groove 324 and is pivotally connected to the lock connecting rod 323, the lock connecting rod 323 is positioned above each of the primary lock base 321, the primary lock tongue 322 is pivotally connected to the primary lock base 321, thereby the lifting or decending of the lock connecting rod 323 can drive the primary lock tongue 322 to perform a rotation by a pivot connecting point in the primary lock base 321, thereby realizing that the primary lock tongue 322 enters the primary lock groove 325 or leaves the primary lock groove 325, so as to realize a transition between two states of the hanging member 22 snapping into the primary lock groove 325 and leaving the primary lock groove 325.

The present embodiment uses one lock connecting rod 323 to control the primary lock tongues 322 of a plurality of the primary lock bases 321 at the same time, realizing synchronous unlocking and locking functions of a plurality of the primary lock bases 321, improving the unlocking step of the battery pack 100, and speeding up an efficiency of swapping the battery pack 100.

The inverted L shape primary lock groove 325 comprises an opening hole 3251 extending in the vertical direction and a locking hole 3252 extending in the horizontal direction, the top of the opening hole 3251 communicates with the locking hole 3252, the hanging member 22 first reaches an interacting position of the opening hole 3251 and the locking hole 3252 from the bottom of the opening hole 3251 along the vertical direction, then enters the locking hole 3252, and then realizing the locking of the hanging member 22 to the locking hole 3252 of the primary lock groove 325 by means of lifting or decending the lock connecting rod 323.

Specifically, when in use, the battery pack 100 upwardly enters the position of the longitudinal beam 8 from the bottom of the electric vehicle 200, and the unlocking mechanism of the battery swapping apparatus pushes the lock connecting rod 323 to move upward, driving the primary lock tongue 322 to open the primary lock groove 325, the hanging member 22 in the groove 11 of the battery pack 100 is inserted into the primary lock groove 325 from the bottom surface of the corresponding primary lock base 321, then the battery pack 100 moves towards the direction of the locking hole 3252 of the primary lock groove 325 under the push of the battery swapping apparatus, until the hanging member 22 enters into the locking hole 3252, and then driving the hanging member 22 of the battery pack 100 to move toward the locking hole 3252 in a direction that is away from the opening hole 3251, the unlocking mechanism of the battery swapping apparatus no longer acts to the lock connecting rod 323, thereby the primary lock tongue 322 resets, and the hanging step of the battery pack 100 is completed. In the locking step of the hanging member 22, the lock connecting rod 323 drives the primary lock tongue 322 to rotate under the push of the battery swapping apparatus, so that the opening hole 3251 of the primary lock groove 325 mutually communicating with the locking hole 3252, after the hanging member 22 enters the locking hole 3252, the primary lock tongue 322 will rotate under an effect of gravity of the lock connecting rod 323 thereby sealing a retraction path of the hanging member 22. By this moment, it is in a state that the battery pack 100 is completely locked to the electric vehicle 200. When the battery needs to be swapped, the battery swapping apparatus pushes the lock connecting rod 323 up, thereby making the primary lock tongue 322 rotate, communicating the opening hole 3251 with the locking hole 3252, by this moment, moving the battery pack 100 to eject the hanging member 22 from the primary lock groove 325, which can complete the unloading step of the battery pack 100.

Wherein, the lock connecting rod 323 comprises a bar-shaped rod member, the rod member is pivotally connected with the primary lock tongue 322 of the primary lock base 321. In order for the primary lock tongue 322 to be automatically and quickly reset under a situation that the battery swapping apparatus no longer pushes the lock connecting rod 323, a reset spring 326 is furhter arranged between the lock connecting rod 323 and at least one primary lock base 321, after a contact between the battery swapping apparatus and the lock connecting rod 323 is dismissed, the lock connecting rod 323 will naturally descend under its own gravity and a pulling force of the reset spring 326 to drive the primary locking tongue 322 to rotate thereby locking the battery pack 100.

Figure 9:
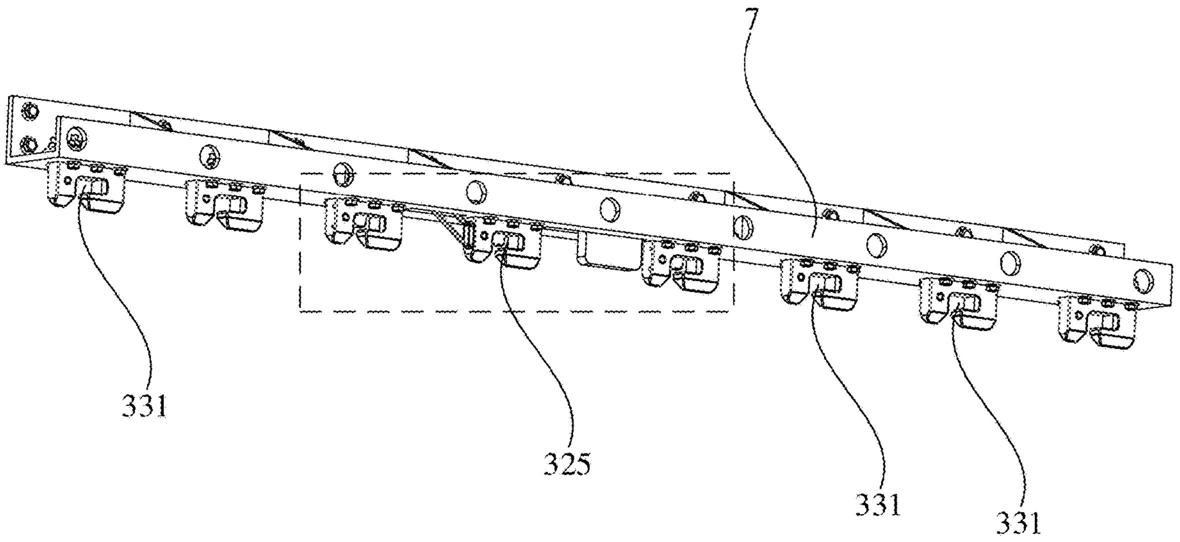
FIG. 9 is a structural schematic diagram of a position at a fixing bracket and locking mechanisms of FIG. 7.

As shown in FIG. 7 and FIG. 9, the locking mechanism 3 further comprises a supporting base 33, the through groove 31 further comprising a supporting groove 331, the supporting base 33 is arranged with the supporting groove 331 that is horizontally penetrating and is in an inverted L shape, the other remaining hanging members 22 of the top hanging type battery pack 100 are arranged to pass through the supporting groove 331. After realizing a connection of the battery pack 100 and the longitudinal beam 8 by means of adopting the primary lock 32, arranging the supporting base 33 of similarly having an inverted L-shaped through groove 31 around the primary lock 32, using the supporting groove 331 of the supporting base 33 to connect the hanging member 22, thereby increase the amount of connecting points of the top hanging type battery pack 100 and the locking mechanism 3, so that the top hanging type battery pack 100 is more steadily connected to the electric vehicle 200.

Figure 8:
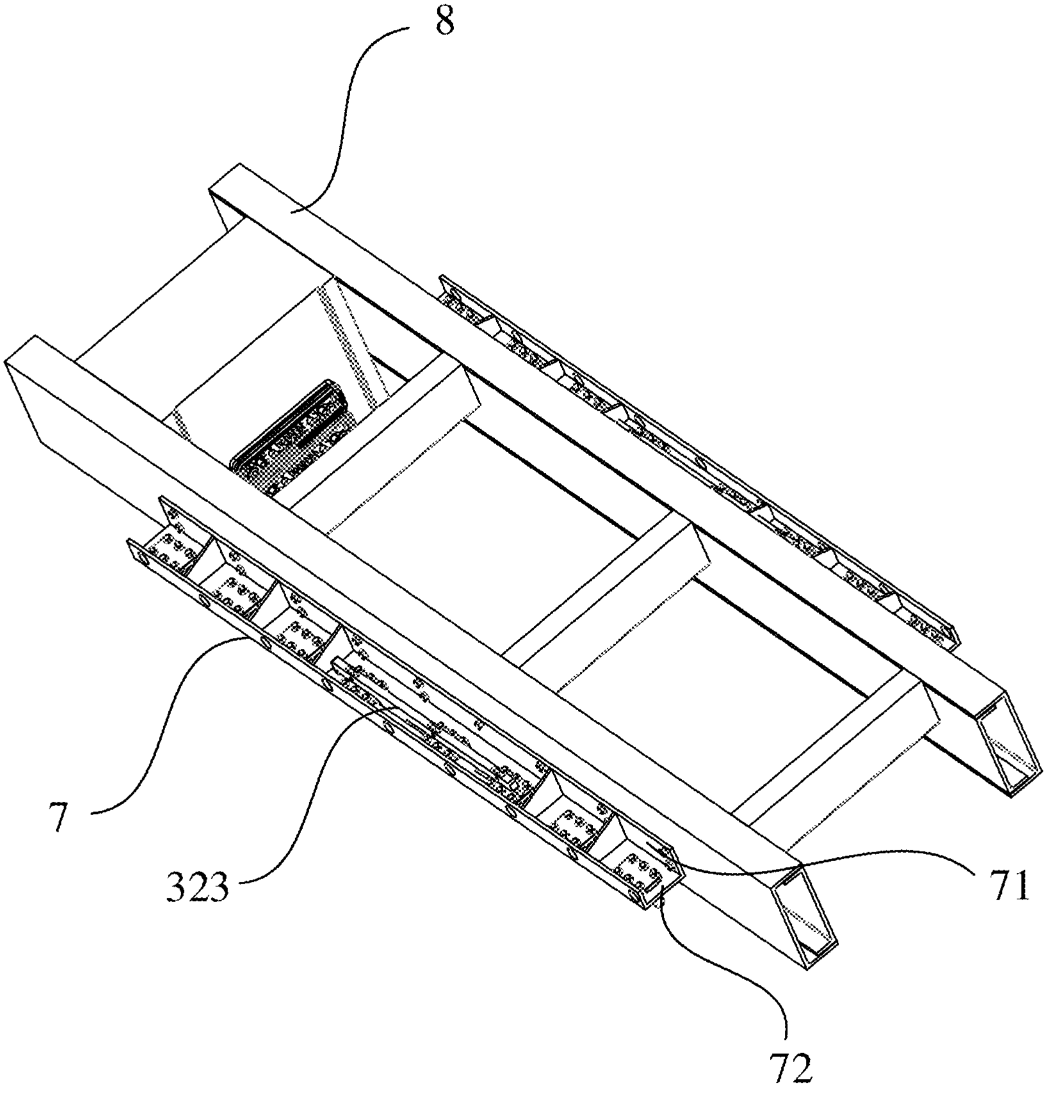
FIG. 8 is a structural schematic diagram of another viewing angle of FIG. 7.
Figure 10:
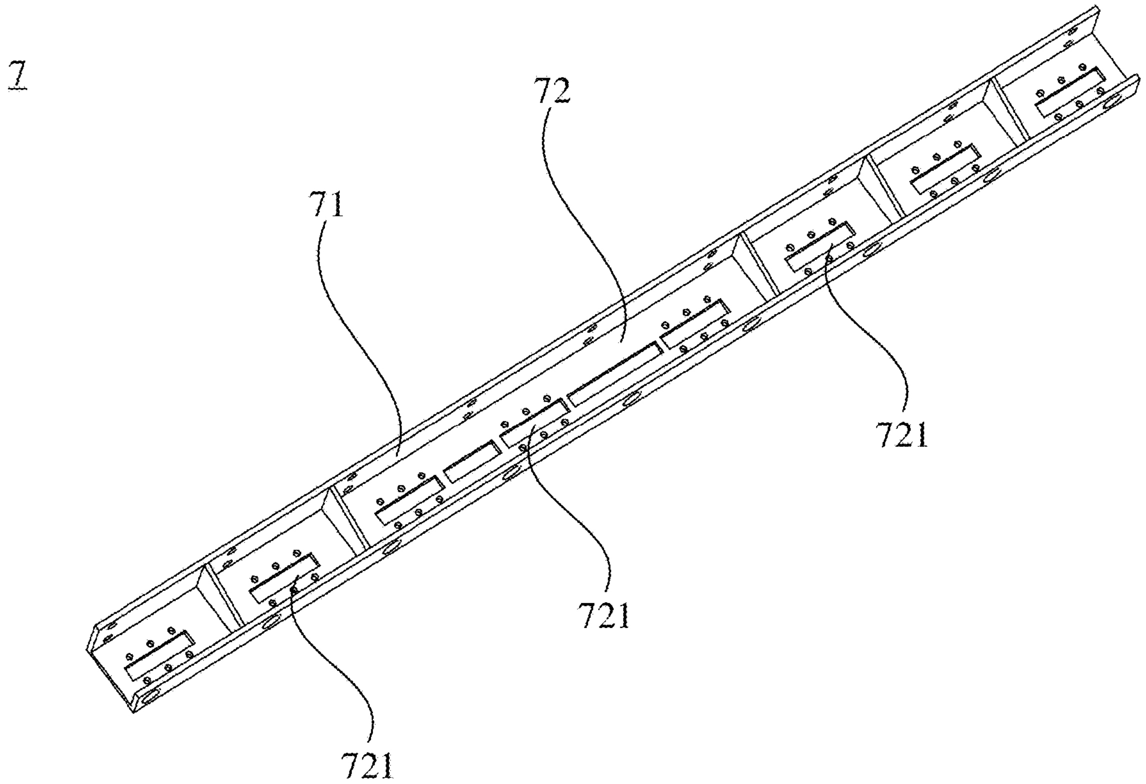
FIG. 10 is a structural schematic diagram of the fixing bracket of FIG. 7.

As shown in FIG. 8-FIG. 10, in order to make the force borne at a position of the locking mechanism 3 more uniformly transmitted to the longitudinal beam 8, the electric vehicle 200 further comprises a fixing bracket 7, the fixing bracket 7 is a plate-shaped structure, the fixing bracket is 7 arranged to side walls of the longitudinal beam 8, and the locking mechanism 3 is connected to the longitudinal beam 8 by means of the fixing bracket 7. Comparing to connecting the locking mechanism 3 directly to the longitudinal beam 8, connecting the locking mechanism 3 to the longitudinal beam 8 by means of the fixing bracket 7 increases the connecting area of the locking mechanism 3 and the longitudinal beam 8, making the battery pack 100 more stably connected to the electric vehicle 200.

Specifically, the fixing bracket 7 comprises a first plate body 71 and a second plate body 72 connected in sequence, the first plate body 71 and the second plate body 72 are perpendicular to each other, the first plate body 71 is connected to side walls of the longitudinal beam 8, the locking mechanism 3 is arranged on the second plate body 72 and extends downward, and the connecting point of the locking mechanism 3 and the lock connecting structure 2 is located above a lower end of the longitudinal beam 8. Thereby under a situation that the connecting area of the locking mechanism 3 and the longitudinal beam 8 is ensured, when the top hanging type battery pack 100 is mounted on the electric vehicle 200, due to the height of the connecting point of the locking mechanism 3 and the lock connecting structure 2 is raised above a lower surface of the longitudinal beam 8 of the vehicle body, it can entirely increase the height of the top hanging type battery pack 100, and further provide spaces in the height direction for the battery swapping apparatus to perform a battery swapping.

As shown in FIG. 10, specifically, the first plate body 71 and the second plate body 72 are both flat plate structures, the first plate body 71 is attached to an outer wall surface of the longitudinal beam 8, and the second plate body 72 perpendicularly extends outward from a side wall of the first plate body 71, the locking mechanism 3 is screwed on the second plate body 72 by means of a flange, and the second plate body 72 is arranged with a connecting groove 721 corresponding to the lock tongue groove 324 of the primary lock base 321, and the connecting groove 721 communicates with the lock tongue groove 324.

In other specific implementation manners, the fixing bracket 7 can also be arranged at the bottom of the longitudinal beam 8, which will not be repeated here.

As shown in FIG. 7, the electric vehicle 200 further comprises a reinforcing member 9 for mounting an electrical connector, the reinforcing member 9 is positioned between two of the longitudinal beams 8, and two ends of the reinforcing member 9 are respectively connected to two of the longitudinal beam 8. The reinforcing member 9 has a reinforcing effect, and the electrical connector is connected to two of the longitudinal beams 8 by means of the reinforcing member 9, which effectively strengthens the entire structural strength of the electric vehicle 200 and improves the safety and stability of the electric vehicle 200.

Embodiment 3

The same sections in embodiment 3 and embodiment 1 will not be repeated, and only the different sections will be described. In the present embodiment 3, three box covers 13 are integrally formed as one box cover 13 with two U-shaped grooves 11, and the plurality of battery cell accommodating cavities 4 of the box body 12 are covered at the same time by using this one box cover 13. By this moment, two of the mounting brackets 21 are arranged in the U-shaped grooves 11 of the box cover 13, and the battery pack box 1 is connected on the longitudinal beam 8 by means of the mounting brackets 21 in the grooves 11 of the box cover 13 and the hanging member 22.

In other specific manners, the locking mechanism 3 and the hanging member 22 are not limited to the present example, and can also be in a T type locking manner or a threaded locking manner, targeting at two of the manners, they will be briefly introduced below.

The First Kind: T Type Locking Manner

The locking mechanism 3 comprises a locking base, the locking base has a first opening hole extending along the vertical direction, a first threaded portion is arranged in the first opening hole, the first threaded portion is an internal thread, the hanging member 22 comprising a mounting base and an unlocking rod, a second opening hole in the mounting base is extending along the vertical direction, the unlocking rod is vertically arranged in the second opening hole, the unlocking rod can move in the vertical direction relative to the mounting base and the unlocking rod is arranged with a second threaded portion matching with the first threaded portion, the second threaded portion can engage with the first threaded portion, and thereby realizing a locking and an unlocking of the locking mechanism 3 and the hanging member 22.

The Second Kind: Threaded Locking Manner

The locking mechanism 3 comprises a locking base, the locking base has a first opening hole extending along the vertical direction, a limiting portion is arranged in the first opening hole, the first opening hole is a square hole, and the limiting portion is formed above the first opening hole, the hanging member 22 comprising an unlocking rod, an upper end of the unlocking rod is arranged with a stopping portion, the stopping portion comprising a locking rod extending along the horizontal direction, the locking rod is a cylinder-shaped body and is horizontally arranged to the top of the unlocking rod, and the locking rod and the unlocking rod jointly constitute a T type structure.

When the locking rod is at a first angle, the locking rod can pass through the first opening hole and enter the limiting portion of the locking base; when the locking rod rotates to a second angle, the locking rod can be limited in the limiting portion, thereby the locking mechanism 3 and the hanging member 22 are relatively fixed.

In the above-mentioned embodiment, making full use of height spaces below the longitudinal beam 8, when the battery swapping apparatus is dismounting the battery pack 100, the unloaded battery swapping apparatus can directly enter a lower space of the battery pack 100, and without generating an interference with the bottom of the electric vehicle 200; when the battery swapping apparatus is mounting the battery pack 100, the battery swapping apparatus that is loaded with the battery pack 100 can also directly enter below the longitudinal beam 8 to perform a battery swapping, and without generating an interference with the bottom of the electric vehicle 200. In the whole step, there is not only no need to lift the vehicle body, but also no need to arrange a sinking type space or dig a tunnel for the entry and exit of the battery swapping apparatus, reducing the cost, time and difficulty of building a battery swapping station, reducing requirements to a construction site, and improving an efficiency of battery swapping.

Though specific implementation manners of the present application have been described above, it will be understood by a person skilled in the art that this has been done by ways of example only, and the scope of the present application is to be determined by the claims that follow. Various changes or modifications to these implementation manners may be made by a person skilled in the art without departing from the principle and the substance of the present application, and these changes and modifications are within the scope of the present application.

What is claimed is:

1. A top hanging battery pack, the top hanging battery pack is detachably connected to a locking mechanism of a longitudinal beam of an electric vehicle, wherein, the top hanging battery pack comprising a battery pack box and a lock connecting structure;

the lock connecting structure comprising a mounting bracket and several of horizontally arranged hanging members, at least one end of several of the hanging members is connected to the mounting bracket;

a groove recessing toward interior of the battery pack box is arranged to the top of the battery pack box at a position corresponding to the longitudinal beam, the mounting bracket is arranged in the groove, and the battery pack box is detachably connected to the longitudinal beam by means of cooperations between several of the hanging members and the locking mechanism;

the mounting bracket comprises a pair of upright plates erected in the groove, and two ends of the hanging member are respectively connected to the upright plates.

2. The top hanging battery pack according to claim 1, wherein, the mounting bracket is arranged at the groove bottom of the groove;

or, a pair of side walls of the groove constitutes the mounting bracket, and two ends of the hanging member are respectively connected to the pair of side walls of the groove.

3. The top hanging battery pack according to claim 1, wherein, the top hanging battery pack comprises at least two of the mounting brackets, and positions for arranging the mounting brackets in the groove are in one-to-one correspondence to positions of the locking mechanisms of the longitudinal beam.

4. The top hanging battery pack according to claim 1, wherein, the tops of opposite end surfaces of at least a pair of the upright plates are inclinedly arranged with first inclined guiding surfaces, the first inclined guiding surfaces of the upright plates are gradually moving away from each other along a direction that the upright plates are away from the groove bottom of the groove.

5. The top hanging battery pack according to claim 1, wherein, the mounting bracket further comprises a reinforcing plate, the reinforcing plate is respectively connected to two of the upright plates.

6. The top hanging battery pack according to claim 5, wherein, an end of the upright plate away from the groove bottom of the groove is arranged with a first snap slot, the reinforcing plate is arranged with a second snap slot snap-fitting to the first snap slot, and the reinforcing plate is snap-fitted to a pair of the upright plates by means of the first snap slot and the second snap slot;

and/or, the reinforcing plate and the hanging member are arranged on the upright plate at intervals.

7. The top hanging battery pack according to claim 1, wherein, the mounting bracket further comprises a connecting plate, and the upright plate is arranged to the groove bottom of the groove by means of the connecting plate.

8. The top hanging battery pack according to claim 7, wherein, a position of the connecting plate corresponding to the upright plate is arranged with a plug-in hole, a position of the upright plate corresponding to the plug-in hole is arranged with a plug-in block matching the shape of the plug-in hole, the upright plate is arranged to the connecting plate by means of the plug-in hole and the plug-in block;

or, a first position adjusting hole is arranged on the connecting plate, a second position adjusting hole is arranged at a position corresponding to the first position adjusting hole on the battery pack box, the first position adjusting hole and the second position adjusting holes are arranged in one-to-one correspondence, and the first position adjusting hole and/or the second position adjusting hole are oblong holes, the length direction of the waist hole is the width direction of the battery pack box, the first position adjusting hole is detachably connected to the second position adjusting hole by means of a connecting assembly.

9. The top hanging battery pack according to claim 3, wherein, a reinforcing beam is arranged at a position corresponding to the mounting bracket in the battery pack box, and the mounting bracket is connected on the reinforcing beam.

10. The top hanging battery pack according to claim 9, wherein, the mounting bracket and the battery pack box have a sealing member in between.

11. The top hanging battery pack according to claim 9, wherein, there are two reinforcing beams, and the reinforcing beams divide the inner space of the battery pack box into at least three battery cell accommodating cavities for placing battery cells.

12. The top hanging battery pack according to claim 11, wherein, the reinforcing beam is arranged with a wire slot for routing cables, and the battery cell accommodating cavities at two sides of the reinforcing beam are communicated by means of the wire slot.

13. The top hanging battery pack according to claim 11, wherein, several of the battery cell accommodating cavities are sequentially arranged at intervals along the horizontal direction;

several of the battery cell accommodating cavities comprise a plurality of side battery cell accommodating cavities, and the plurality of the side battery cell accommodating cavities are distributed to two sides of the groove;

several of the battery cell accommodating cavities further comprises a middle battery cell accommodating cavity, the middle battery cell accommodating cavity is arranged at a central area of the battery pack box, a plurality of the side battery cell accommodating cavities are distributed at two sides of the middle battery cell accommodating cavity, and the groove is formed in between the middle battery cell accommodating cavity and the side battery cell accommodating cavity.

14. The top hanging battery pack according to claim 11, wherein, the battery pack box comprises a box body and a box cover, the groove is arranged at the top of the box body, and the top of the box body is also arranged with several openings, the box cover covers the opening of the box body, and the box body, the box cover, and the reinforcing beam jointly constitute the battery cell accommodating cavity;

the groove is positioned between two of the openings that are adjacent.

15. The top hanging battery pack according to claim 1, the bottom of the battery pack box is arranged with an unlock guiding hole for an unlocking mechanism of a battery swapping apparatus to pass through, and the length direction of the unlock guiding hole is parallel to the width direction of the battery pack box, the unlock guiding hole penetrates from the bottom of the battery pack box to the groove, and the unlock guiding hole is arranged at a position corresponding to the lock connecting rod of the locking mechanism.

16. An electric vehicle, wherein, it comprises a longitudinal beam and the top hanging battery pack according to claim 1, the locking mechanism is arranged on the longitudinal beam, and the top hanging battery pack is detachably connected to the locking mechanism by means of the lock connecting structure.

17. The electric vehicle according to claim 16, wherein, the locking mechanism is arranged with a through groove for the hanging member to pass through;

the locking mechanism comprises a primary lock, the primary lock comprising at least two primary lock bases, at least two primary lock tongues, and a lock connecting rod, the through groove comprising a primary lock groove, the primary lock base is arranged with the primary lock groove that is horizontally penetrating and is in an inverted L shape, and the primary lock bases and the primary lock tongues are arranged in one-to-one correspondence;

the primary lock base is arranged on the longitudinal beam, a first end of the primary lock tongue is rotatably connected to the primary lock base, and a second end of the primary lock tongue is rotatably connected to the lock connecting rod;

at least some of the hanging members of the top hanging battery pack pass through the primary lock groove;

when the lock connecting rod bears an acting force of an unlocking mechanism of a battery swapping apparatus, the lock connecting rod drives the primary lock tongue to rotate and open an opening of the primary lock groove, and the hanging members enter or leave the primary lock groove by means of the opening of the primary lock groove;

the locking mechanism further comprises a supporting base, the through groove further comprising a supporting groove, the supporting base is arranged with the supporting groove that is horizontally penetrating and is in an inverted L shape, and some of the hanging members of the top hanging battery pack are arranged to pass through the supporting groove.

18. The electric vehicle according to claim 16, wherein, the electric vehicle further comprises a fixing bracket, the fixing bracket is a plate-shaped structure, the fixing bracket is arranged to side walls of the longitudinal beam or the bottom of the longitudinal beam, and the locking mechanism is connected to the longitudinal beam by means of the fixing bracket.

19. The electric vehicle according to claim 18, wherein, the fixing bracket comprises a first plate body and a second plate body connected in sequence, the first plate body and the second plate body are perpendicular to each other, the first plate body is connected to the side walls of the longitudinal beam, the locking mechanism is arranged on the second plate body and extends downward, and a connecting point of the locking mechanism and the lock connecting structure is located above a lower end of the longitudinal beam.

20. The top hanging battery pack according to claim 1, wherein, the bottom of the battery pack box is further arranged with a position guiding groove for a positioning structure of the battery swapping apparatus to pass through, and the length direction of the position guiding groove is parallel to the width direction of the battery pack box;

around a lower end side wall of the position guiding groove is arranged with a second inclined guiding surface arranged inclinedly, and along the bottom-up direction, the second inclined guiding surface gradually approaches.

* * * * *